Patented Mar. 26, 1935

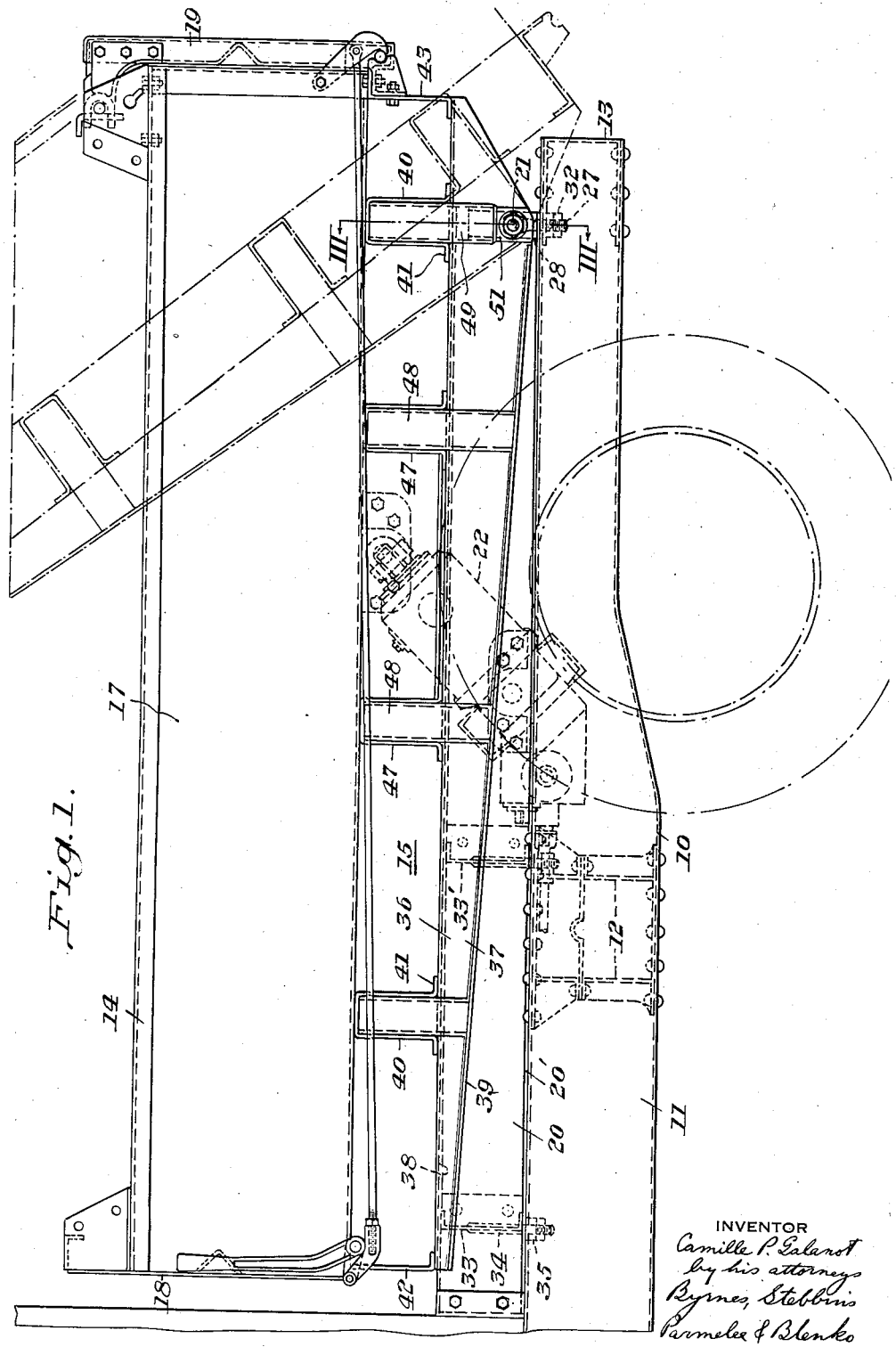

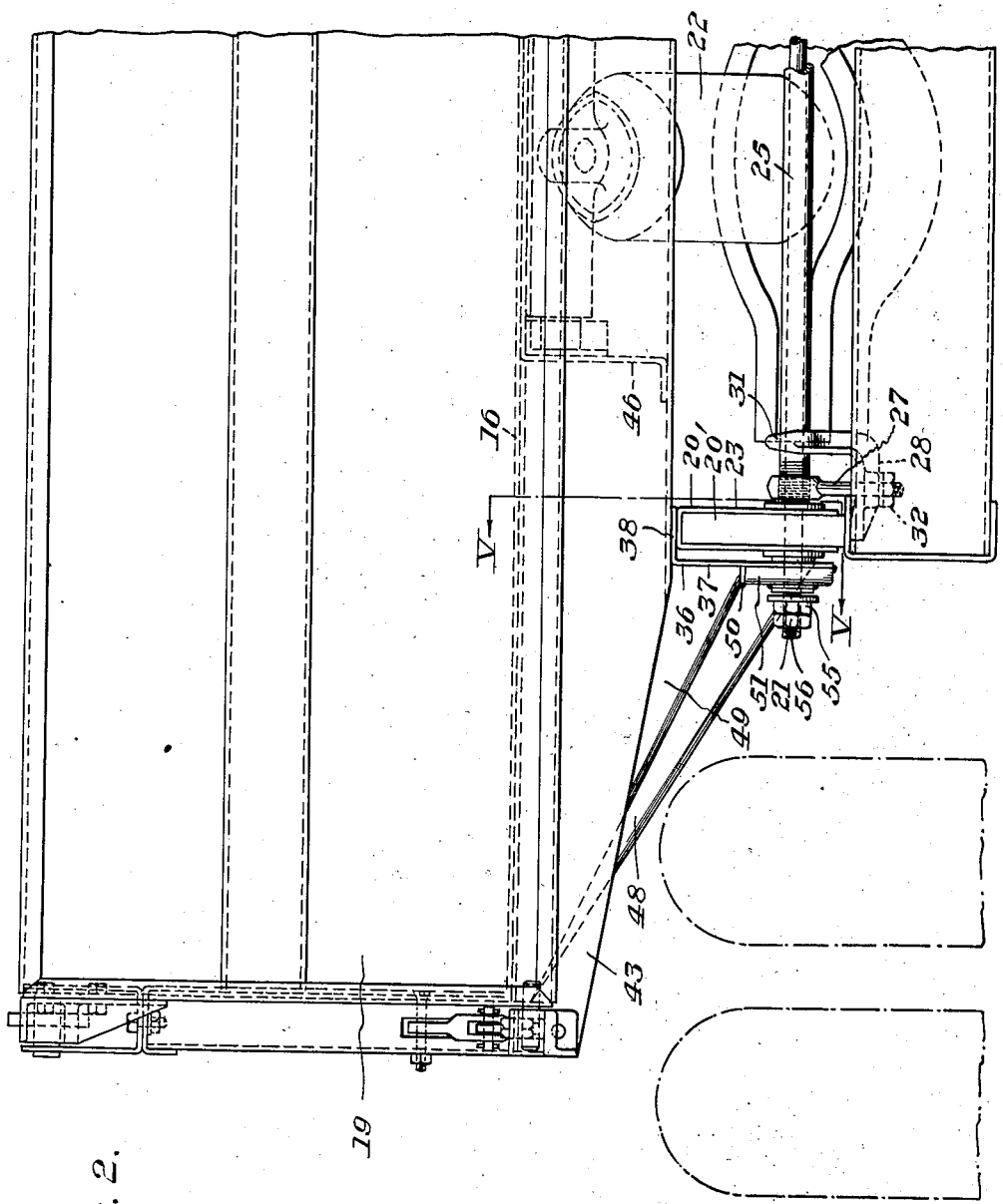

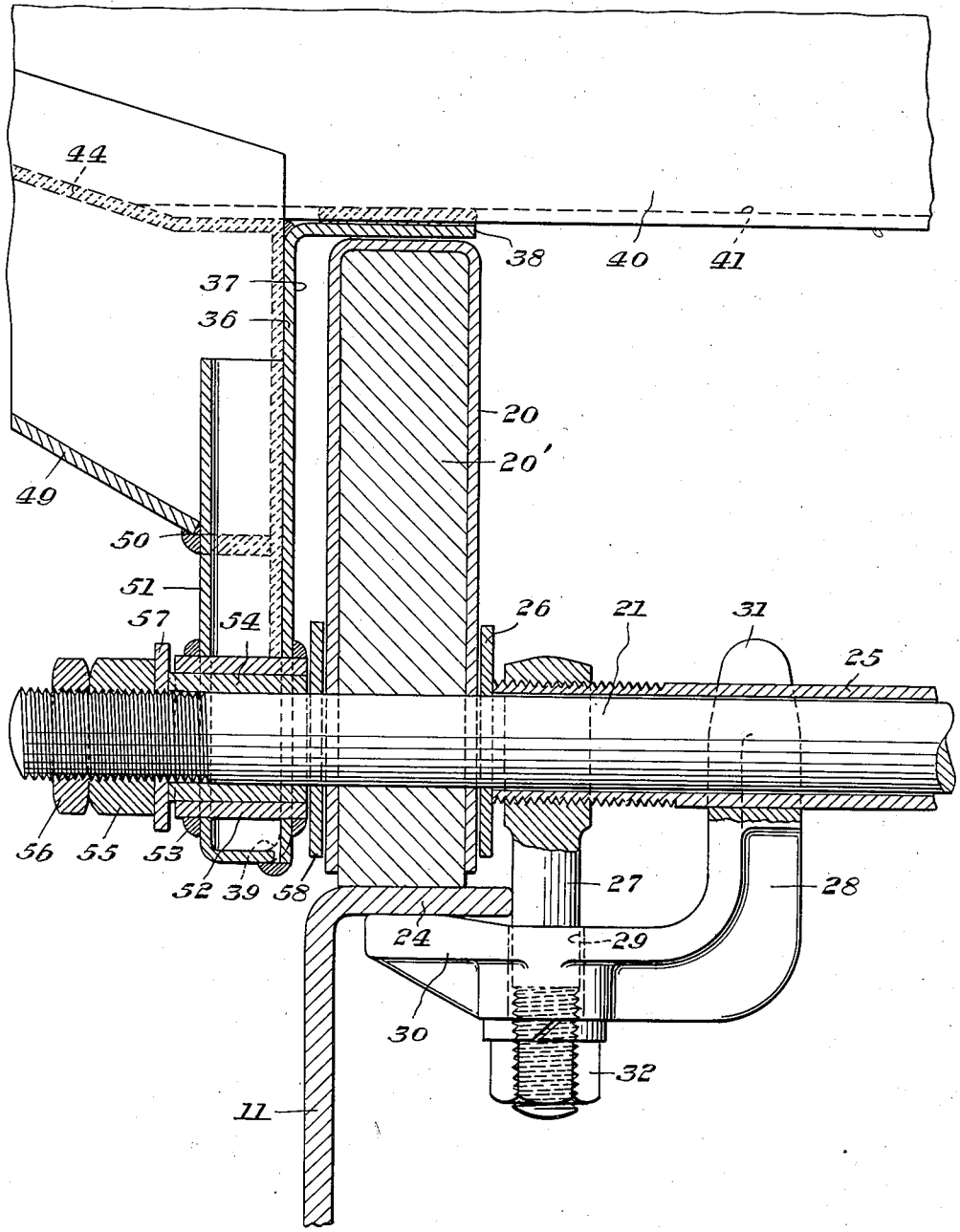

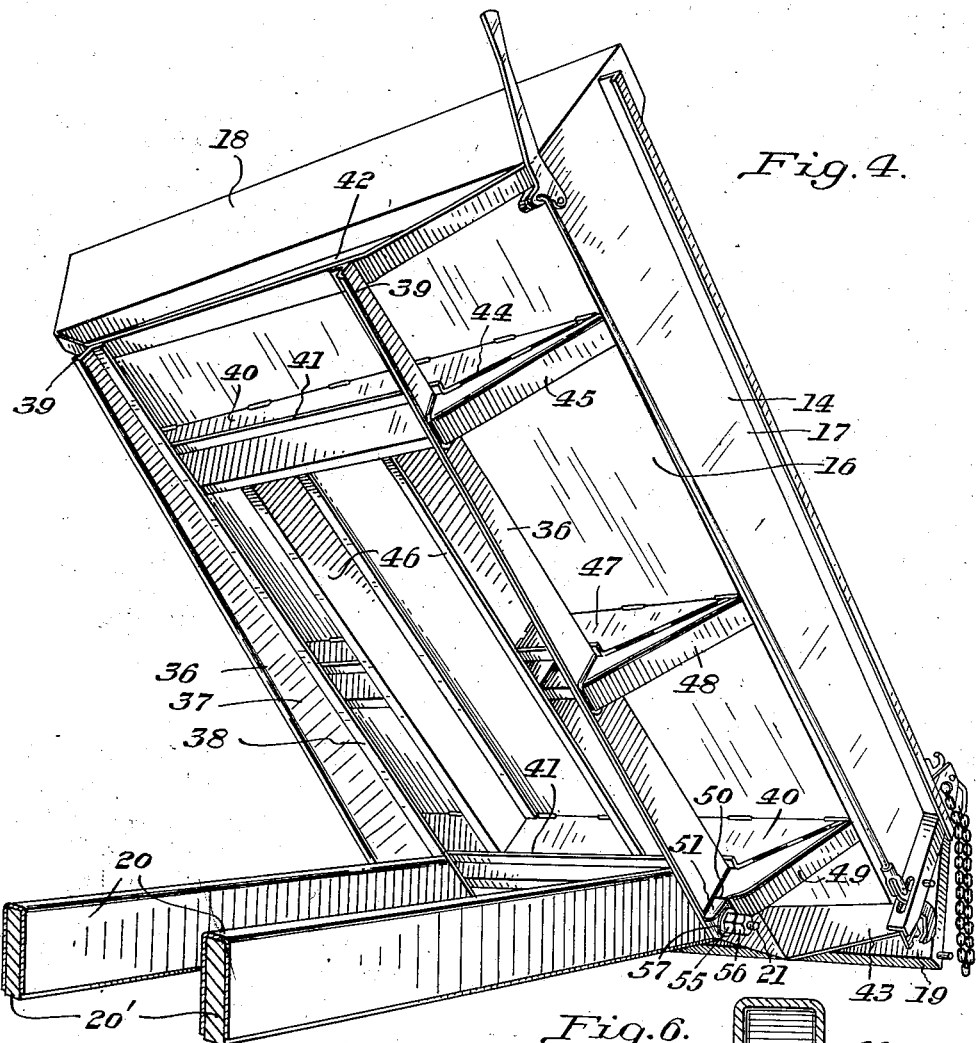
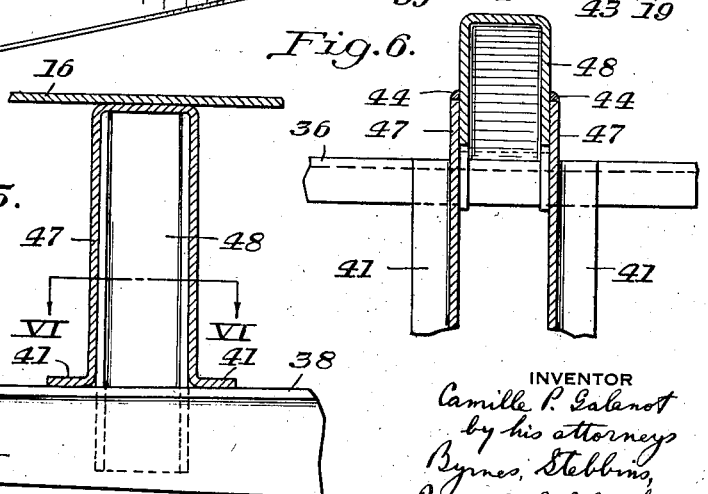

1,995,387

UNITED STATES PATENT OFFICE 1,995,387

DUMP BODY FOR VEHICLES

Camille P. Galanot, Youngstown, Ohio, assignor to The Commercial Shearing & Stamping Company, Youngstown, Ohio, a corporation of Ohio Original application March 14, 1931, Serial No. 522,642. Divided and this application February 12, 1932, Serial No. 592,470

4 Claims. (Cl. 298—17)

This is a divisional application of my copending application, Serial No. 522,642, filed March 14, 1931.

My invention relates to a tilting body for vehicles such as motor trucks and, in particular, to a body of the character described which can readily be attached to standard designs of motor trucks with great facility.

The principal object of my invention is to provide a dumping body for motor trucks or other vehicles which may be attached thereto or demounted therefrom.

Another object of the invention is to provide a tilting body characterized by great strength and rigidity.

A further object of the invention is to construct a dumping body having the foregoing characteristics from standard materials such as structural shapes and steel plates which can be readily manipulated.

In dumping bodies, as they have heretofore been constructed it has been observed that when the body is lifted while the truck stands on unlevel ground, the body is somewhat twisted or warped so that when lowered it fails to return to the proper position. It is a further object of the invention to provide means for insuring that the body will return to its original position even though the nature of the ground whereon the truck is standing tends to warp or twist the frame of the vehicle or the body.

A further object of the invention is to improve the means for securing the body on the vehicle chassis to eliminate the necessity for drilling holes therein or otherwise making elaborate preparations for the reception of the body. It is also an object of the invention to improve the constructions heretofore employed for providing pivotal support on a tilting body on a vehicle chassis.

For a more complete understanding of the invention, reference should be had to the accompanying drawings, in which Figure 1 is a partial side elevation of an automotive vehicle chassis having a long form of the tilting body incorporating the features of the present invention mounted thereon;

Figure 2 is a partial rear elevation of the vehicle as shown in Figure 1;

Figure 3 is a sectional view taken along the line III—III of Figure 1;

Figure 4 is a perspective view of a short form of the tilting body in its uplifted position, certain details being omitted for clearness;

Figure 5 is a partial sectional view along the line V—V of Figure 2; and

Figure 6 is a sectional view along the line VI—VI of Figure 5.

Referring now in detail to the drawings, an automotive vehicle such as a motor truck is indicated at 10. The usual construction of vehicles of this type includes a pair of chassis rails 11, which are generally steel channels having such detailed construction as the design of the vehicles may require. The rails 11 are generally connected by cross members such as 12 and a tail piece 13.

A tilting body for the vehicle is indicated at 14 and comprises a frame indicated generally at 15, a floor 16, side walls 17, an end wall 18, and a tail gate 19. The frame 15 rests on sills 20 clamped to the rails 11 of the vehicle chassis. The frame is pivoted on these sills by means of a pivot shaft 21 for tilting movement to the position indicated in Figure 1 in chain lines, under the influence of the force exerted by a hydraulic jack 22. The details of the jack and its connection to the body and frame constitute no part of the present invention but are fully disclosed and claimed in my copending applications, Serial Nos. 257,707 and 411,777. As is usual in devices of the general type under discussion, a fluid pump driven from a power take-off on the truck transmission is provided and a valve is employed for controlling the supply of fluid from the pump to the jack and the exhaust of fluid from the latter.

Referring now more particularly to Figures 3 through 6, the details of the body construction and mounting will now be described. The sills 20 comprise a wooden core 20' covered on three sides by a sheet metal shell 23. The sills rest on the upper flange 24 of the rails 11 and are secured thereto by means presently to be described.

The pivot shaft 21 for tiltably supporting the body 14 on the sills 20 extends across the chassis, traverses the sills 20 and extends therebeyond. Between the sills 20, the shaft 21 is surrounded by a sleeve 25, the ends of which are provided with a straight thread. Thrust plates 26 are positioned between the ends of the sleeve 25 and the metal sheathing 23 of the sill 20.

An eye-bolt 27 is threaded on each end of the sleeve 25 and is adjusted thereon until the shank of the bolt engages the edge of the upper flange 24 of the rail channel. The sills 20 are thus laterally positioned with respect to the rails and are prevented from shifting in either direction. A clamp 28 consisting of a right angle bracket has a hole 29 for the passageway of the eye-bolt 27. One end of the clamp is adapted, as shown at 30, for engagement with the under surface of the top flange 24 of the rail 11. The other end of the clamp, as shown at 31, is bifurcated to form a yoke adapted to engage the sleeve 25 surrounding the shaft 21.

As a result of the construction just described, it is possible to clamp the sills 20 firmly to the rails 11 without the necessity of drilling the rails or making other preparations which consume time and labor. As before stated, the position of the eye-bolt 27 on the threaded ends of the sleeve 25 determine the position of the sills with respect to the rails 11 and prevent lateral displacement thereof. When the clamps 28 are placed in position and tightened up by means of nuts 32 on the eye-bolts 27, the sills 20 are drawn firmly against the top flange of the rails and are rigidly secured thereto.

The forward ends of the sills 20 are secured to the rails 11 by means similar to that just described for the rear ends thereof. A diaphragm 33 traverses the sills 20 adjacent their forward ends and has end flanges for bolting thereto. By means of bolts 34 welded to the diaphragm, and clamps 35, similar to those shown at 28, the forward ends of the sills are secured tightly to the top flange of the rails. The sills are also braced by a diaphragm similar to 33, shown at 33' located about midway of their length. These diaphragms are omitted from Figure 4 for the sake of clearness.

The body 14, which is mounted on the shaft 21 for tilting with respect to the sills 20, comprises a pair of longitudinal members 36 which preferably take the form of angle bars having one flange 37 disposed vertically and another flange 38 disposed horizontally. The flange 37 may conveniently be tapered from the rear end of the body to the front thereof and may have its edge rolled slightly as at 39 for a purpose to appear later. Adjacent the front and rear ends of the members 36, and transversely thereof, open bottomed box girders 40 are positioned. The lower edges of the girders are turned outward to form flanges 41 which provide a wide bearing surface for the girders on the members 36. At the front and rear ends of the members 36, channel 42 and Z-bar 43 are disposed. The girders, channel and Z-bar are preferably welded to the longitudinal members.

The ends of the girders 40 extend beyond the members 36 and are cut on a bias to the length of the girder as indicated at 44. The open ends of the girders are covered by box closers 45 which are simply hollow members formed from a roughly triangular sheet of metal of dimensions such that they are adapted to slide into the open ends of the girders 44. The closers 45 are welded to the ends of the girders, and they are designed so that their inner and lower ends extend downwardly below the bottom edges of the girders and engage the vertical flanges of the members 36. At this point, the closers are welded to the side flanges of the longitudinal members.

Auxiliary longitudinal members 46 comprising Z-bars are disposed between the inner flanges of the girders 40 and within the sills 20 and the longitudinal members 36. Short girders 47 extend transversely between the Z-bars 46 and the longitudinal members 36 at points intermediate the girders 40. The short girders 47 correspond exactly in shape and construction to the end portions of the girders 40 and have box closers 48 welded thereto and extending downwardly to engage the vertical flange 37 of the members 36.

It will be apparent from the foregoing that the body floor 16 is thus provided with proper support at all points thereof. The floor, of course, rests on the channels 42 and 43, the girders 40 and 47, and the Z-bars 46 and is welded thereto at frequent intervals. The construction is such that the entire body, while made up of members formed from comparatively thin plates, is characterized by the utmost strength and rigidity. The girders 40 and 47 afford ample support for the central portion of the body floor together with the Z-bars 46 and the closers 45 and 48 provide substantial bracing for the edge portions of the floor and the ends of the girders to which they are connected. The construction is simple and relatively inexpensive. Another advantage is that the central portion of the under frame of the body defined by the girders 40 and the Z-bars 46 provides an admirable space for the jack 22 and the mechanism by which it is connected to the body, as indicated in Figure 1. The number of girders 40 and 47 may vary with the length of the body as shown in Figures 1 and 4.

As previously explained, the body 14 is tiltably mounted on the sills 20 by means of the pivot shaft 21. The details of the pivotal support will now be described. As shown in Figure 3, the shaft 21 extends through the vertical flange of the longitudinal members 36. The box closers 49 for the rear girder 40 differ from the other closers slightly in that their lower ends are sheared off at an angle, as shown at 50. Through the opening thus formed, a bearing box or housing 51 extends upwardly from the lower edge of the flange 37. The bearing box 51 may conveniently take the form of a metal sheet formed up into box shape. The box is welded to the flange 37 of the member 36 and to the lower cropped edge 50 of the closure 49. Alined bearing openings are formed in the flange 37 in the member 36 and the outer wall of the box 51. A bearing 52 is seated in these openings and is welded at 53 to the flange 37 and the wall of the box 51. Within the bearing 52, a bushing 54 receives the end of the shaft 21. The protruding end of the shaft is threaded and provided with a nut 55 and a lock nut 56. A washer 57 is disposed between the nut 55 and the bushing 54 and a thrust plate 58 surrounds the shaft between the inner ends of the bearing 52 and the bushing 54 and the metal sheet covering the outer surface of the sill core.

It will be apparent from the foregoing description that the body construction of the present invention is characterized by numerous advantages. Several of these have already been mentioned. In addition to the strength and rigidity imparted to the under frame of the body by the construction employed, another particular advantage results from the arrangement of the longitudinal members 36 relative to the sills 20. It will be seen in Figure 3 that when the body is lowered the members 36 have their flanges disposed in close relation to the outer and top surfaces of the sills 20. The weight of the body and its load is thus carried directly on the sills 20 and is transmitted therethrough to the vehicle chassis rails 11. The vertical flange of the members 36 is rolled or beaded as at 39, as previously stated, so that when the body is raised while the vehicle is standing on unlevel ground, if the body and chassis are warped or twisted slightly from their normal relation, the lower edge of the flanges 37 will engage the outer surfaces of the sills 20 on lowering of the body, to guide the latter into its proper relation with the sills when in lowered position.

By employing welded construction throughout, I simplify the manufacture of bodies and reduce the cost thereof. At the same time, strength and rigidity are not sacrificed but the resulting construction is amply strong and rigid for the requirements of any class of surface. The entire superstructure, including the sills and body, is firmly fixed relative to the chassis rails without necessitating any extensive work on the latter. The bearing construction by which the body is tiltable on the supporting sills is very simple and formed entirely of welded sheet metal parts. At the same time, it affords ample bearing surface and meets practical requirements in an eminently satisfactory manner.

Certain details such as those of the body walls, tail gate, and lifting jack have not been described since they constitute no part of the present invention.

Although I have illustrated and described one specific embodiment of my invention, it is to be understood that this embodiment is merely illustrative as it shows only one preferred form. Since the invention may be otherwise embodied, it is not to be limited by the disclosure or otherwise, except by the scope of the appended claims.

I claim:

1. A dump body comprising sills resting on the chassis rails of a vehicle, a shaft extending through said sills, angle bars pivotally suppported on said shaft adjacent said sills, on bearings seated in one flange of the bars, the other flange of the bars being adapted to rest on said sills, and a body carried on said bars.

2. In a tilting vehicle body, sub-sills adapted to rest on the vehicle chassis rails, a tilting shaft for the body traversing said sills, a threaded sleeve surrounding said shaft, and an eye-bolt threaded on said sleeve, adjusted to engage one of said rails laterally to position the sills thereon, and adapted to clamp the shaft thereto.

3. In a tilting vehicle body, sub-sills adapted to rest on the vehicle chassis rails, a tilting shaft for the body traversing said sills, an eye-bolt on said shaft and a clamp on said eye-bolt adapted to engage one of said rails and said shaft.

4. In a tilting vehicle body, sub-sills adapted to rest on the vehicle chassis rails, a tilting shaft for the body traversing said sills, a threaded sleeve surrounding said shaft, and an eye-bolt threaded on said sleeve, adjusted to engage one of said rails laterally to position the sills thereon, and a clamp on said eye-bolt adapted to engage one of said rails and said sleeve, to clamp one of said sills to said last mentioned rail.

CAMILLE P. GALANOT.